July 17, 1928.  1,677,694

F. B. VOGDES

FREQUENCY RESPONSIVE INSTRUMENT

Original Filed April 29, 1922  2 Sheets-Sheet 1

Inventor:
Francis B. Vogdes,
by Albert G. Davis
His Attorney.

July 17, 1928.

F. B. VOGDES 1,677,694

FREQUENCY RESPONSIVE INSTRUMENT

Original Filed April 29, 1922    2 Sheets-Sheet 2

Inventor:
Francis B. Vogdes
by
His Attorney.

Patented July 17, 1928.

1,677,694

UNITED STATES PATENT OFFICE.

FRANCIS B. VOGDES, OF SCHENECTADY, NEW YORK, ASSIGNOR TO GENERAL ELECTRIC COMPANY, A CORPORATION OF NEW YORK.

FREQUENCY-RESPONSIVE INSTRUMENT.

Application filed April 29, 1922, Serial No. 557,485. Renewed March 16, 1928.

My invention relates to electrical instruments and more particularly to frequency responsive instruments.

It is the main object of my invention to provide a very sensitive frequency responsive instrument or relay. Another object of my invention is to provide such an instrument in which the frequency range of operation may be varied through wide limits by the simple expedient of tuning one or more circuits associated therewith. My improved instrument may be used in any place where mechanical movement is to be caused by a slight change in frequency of an alternating current. It may be used by itself as a frequency indicator or when excited by an alternator driven by a prime mover it may be made to act as the governor of that prime mover or merely as a speed indicator therefor. My invention is particularly useful as a governor where it is desired to operate a prime mover at several materially different speeds and to hold the speed constant at any particular value. For instance, in electric ship propulsion, my instrument may serve as the governor of the prime mover to hold a constant speed corresponding to 60 cycles and may be controlled from the bridge in a very simple manner to change the speed to that corresponding to 45 cycles or any other value, which value will be held constant. My instrument might also be used for measuring capacity and reactance if a source of absolutely constant frequency alternating current is available. Other advantages of my instrument will appear as the description proceeds.

Figure 1:
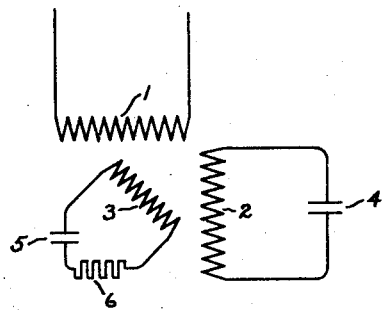
Figure 2:
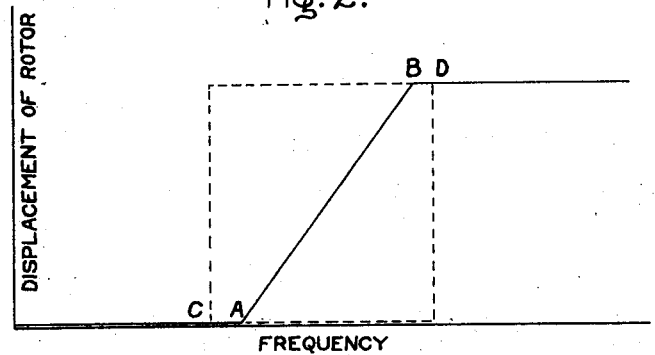
Figure 3:
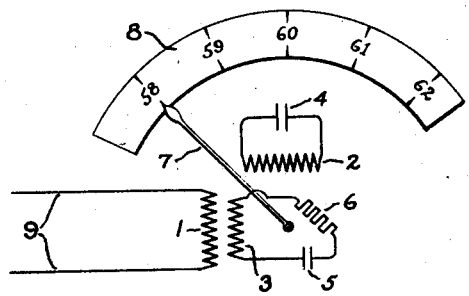
Figure 4:
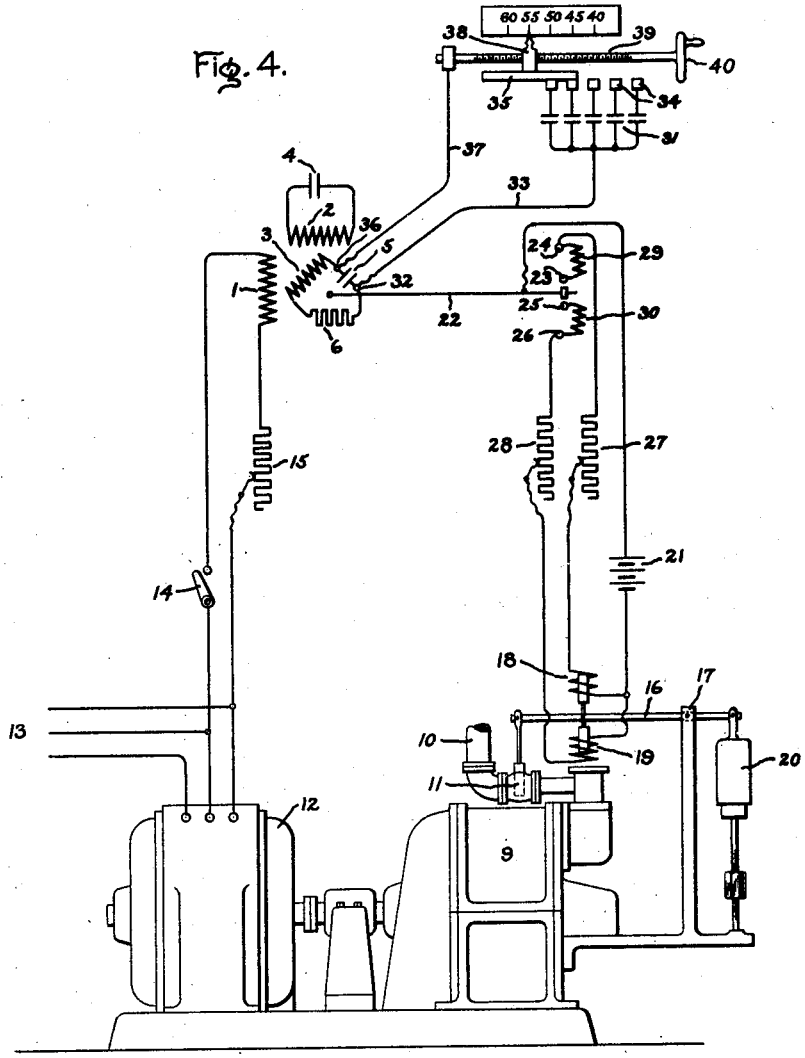

The features of my invention which I believe to be novel and patentable will be pointed out in the claims appended hereto. The principle of operation and construction of the instrument will be described in connection with the accompanying drawings in which Fig. 1 illustrates the electrical connections of the instrument; Fig. 2 shows a frequency-displacement curve illustrative of my instrument; Fig. 3 shows the instrument used as a frequency meter; and Fig. 4 shows the instrument used as a turbine governor which may be adjusted for materially different speeds from a distant point.

The instrument may consist of rotor and stator elements similar to those of alternating current machines using distributed windings. One element, preferably the rotor, may consist of one two-pole distributed winding and the other element of two two-pole windings with their axes of magnetization at an angle to each other, preferably 90 degrees. Power is applied through one of the stator windings, which I will designate the main stator winding, while the rotor and the other stator, which I will designate the auxiliary stator winding, are both short circuited through condensers. Thus, in Figs. 1, 3 and 4, 1 indicates the main stator winding which is to be energized from the source of alternating current the frequency of which it is desired to measure or control; 2 indicates the auxiliary stator winding short circuited through condenser 4 and having its magnetic axis at right angles to the magnetic axis of winding 1, and 3 indicates the rotor winding which is mounted to be freely rotatable with respect to the stator windings and is short circuited through a condenser 5. A resistance 6 is preferably included in the rotor circuit to limit the current.

I have found that an instrument built in this manner and having its secondary tuned to the correct frequency of the supply circuit is very sensitive to slight variations in the supply frequency. Its action may be explained as follows: At a frequency below the point where the secondary circuits, consisting of the rotor circuit and the auxiliary winding circuit, tune to the impressed frequency, the rotor tends to move so that its magnetic axis corresponds to that of the main stator winding 1 due to the currents induced in the rotor. Above the point of tuning the rotor tends to move so that its magnetic axis corresponds to that of the auxiliary stator winding 2. Now, since the transformer action between the rotor windings and the auxiliary 2 is variable, due to the different positions the rotor takes at different frequencies, the natural frequency (i. e. tuning point) of the secondary circuits will also vary. Therefore, the natural frequency of the secondary circuits will vary with changes in the rotor position in such a way that if there is a given position of the rotor for which the secondary will be in tune any other position of the rotor will give a torque tending to move it toward the first position, thus giving a frequency displacement curve like the full line A—B of Fig. 2. When the impressed frequency is equal to the natural frequency of the secondary circuit, the rotor will assume the position illustrated in Figs. 1 and 4.

I have found that if the condenser 4 of the auxiliary circuit is short circuited, the instrument displays characteristics illustrated by the dotted line curves in Fig. 2. Thus, if point C represents the position of the rotor shown in Fig. 3 and a frequency of 57 cycles and point D represents the position of the rotor when rotated to the right 90 degrees from the position shown in Fig. 3 and a frequency of 63 cycles, then by increasing the frequency from 57 to 63 cycles with the condenser in the auxiliary winding short circuited, the rotor will not move until the 63 cycle point is reached at which time the rotor will suddenly turn to a position where the magnetic axis of its winding corresponds to that of the auxiliary winding 2. Also, by decreasing the frequency from 63 cycles to 57 cycles, with the same connections, the rotor will not move until the 57 cycle point is reached, at which time it will suddenly turn through the angle formed by the magnetic axis of the two stator windings and assume the position shown in Fig. 3. There may be conditions where a relay with such characteristics would be desirable, but for the great majority of cases, such as for frequency measurement and regulating purposes, the characteristics shown by the curve C A B D will be necessary, and I have therefore illustrated the preferred modification of my instrument with a condenser 4 connected in the circuit of the auxiliary winding 2. With this last mentioned connection, let us assume that points A and B of Fig. 2 represent 58 and 62 cycles respectively. Now, if the frequency is below 58 cycles the rotor will assume the position shown in Fig. 3, and by increasing the frequency above 58 cycles, the rotor will be uniformly displaced in proportion thereto until 62 cycles is reached, above which frequency the rotor will assume a position represented by the horizontal line BD. In returning to a lower frequency, the displacement will correspond to the same line D B A C. This constant frequency displacement characteristic over the limited range between 58 and 62 cycles is due to the fact that the secondary circuit has slightly different natural frequencies for different positions of the rotor. In Fig. 3 I have illustrated my improved instrument used as a frequency meter. The rotor element consisting of coil 3, condenser 5 and resistance 6 is rotatably supported in any suitable manner and is provided with a pointer 7 which cooperates with a stationary scale 8 graduated and calibrated with the instrument to read frequency. The main stator winding 1 of the instrument is energized over lines 9 from the source of alternating current the frequency of which is to be measured. The angle through which pointer 7 will swing may be varied by varying the angle between the magnetic axes of the two stationary coils 1 and 2; and the range of operation or sensitiveness of the instrument may be varied by varying the value of the capacity 5. It will be noticed that my instrument is very sensitive over a rather narrow range of frequency. This feature makes the device particularly valuable for indicating slight variations in frequency. Thus the instrument illustrated in Fig. 3 has a full scale deflection, corresponding to an arc of 90 degrees, for a change in frequency of 4 cycles. In this instance the meter is adjusted to indicate from 58 to 62 cycles and is therefore particularly adapted for use in a 60 cycle generating plant. The instrument is also useful as a frequency responsive relay. For example, such a relay could be operated from a distant point over an alternating current transmission system by a variation in frequency which is even less than the usual frequency variations on commercial systems.

In Fig. 4 I have illustrated my instrument used as a governor for a turbo-alternator. Means are also provided for varying the tuning of the rotor circuit of the instrument whereby the speed which the governor will hold may be materially changed. 9 represents a steam turbine supplied by steam through a pipe 10 and a throttle valve 11. The turbine drives an alternator 12 which supplies the alternating current mains 13. The main stator winding 1 of my improved instrument is connected to the alternating current mains through a switch 14 and an adjustable resistor 15. The frequency responsive instrument, when used as a governor, will preferably be attached directly to the pilot valve of the usual valve gear and follow-up system therefor. However, for illustrative purposes, I have chosen to show the turbine controlled by my instrument through a solenoid operated throttle valve and electric contacts. Thus, the stem of the throttle valve 11 is secured to a balanced arm 16 pivoted at 17 and adapted to be moved up or down to open or close the valve by electric solenoids 18 and 19. A dashpot 20 may be provided to steady the operation. One side of the energizing coils of the solenoids are connected to a battery 21 or other suitable source of current. The other side of the battery 21 is connected to a contact arm 22 secured to the rotor element of my frequency responsive device and adapted to be rotated therewith upon variations in the frequency of the alternator 12. Arm 22 cooperates with stationary contacts 23 and 24 to close the circuit of solenoid 18 through more or less resistance when the frequency is low, and with stationary contacts 25 and 26 to close the circuit of solenoid 19 through more or less resistance when the frequency is high. Resistances 27 and 28 may be provided in the circuits of solenoids 18 and 19 for adjusting purposes. When the frequency is correct, the arm 22 will occupy the central position illustrated. It will now be evident that upon a slight decrease in frequency below normal, arm 22 will move to close the circuit of solenoid 18 through resistances 27 and 29. This will cause the pivoted arm 16 to raise slightly and in so doing, open the valve 11 a proportionate amount. A still further decrease in frequency will short circuit resistance 29 and the valve will be opened still further allowing more steam to be supplied to the turbine which will then increase its speed and correct the frequency.

An increase in frequency above normal will energize solenoid 19 in a similar manner to lower the frequency. Suitable stops may be provided to limit the movement of the arm 22 or its angle of displacement may be made equal to the length of the arc formed by the contacts 24, 26. Since the instrument is very sensitive to changes in frequency, the operation may be made vibratory in character somewhat similar to the action of a Tirrill regulator. This provides a highly accurate and inexpensive form of governor.

In Fig. 4 I have shown the capacity 5 of the rotor circuit connected in parallel with a variable capacity for tuning purposes. Thus, a plurality of condensers 31 have one side connected to the rotor circuit at 32 through line 33. The other sides of the condensers 31 are connected to separate contacts 34. A sliding contactor 35 connected to the rotor circuit at 36 through line 37 is adapted to be moved over contacts 34 to connect more or less of the condensers 31 in parallel with the capacity 5 of the rotor. The sliding contactor 35 may be fastened to a nut 38 and moved back and forth by a screw shaft 39 and hand wheel 40.

It will now be evident that varying the amount of capacity in the rotor circuit in this way will change the tuning of the secondary circuit and cause the rotor to respond to different frequencies. Increasing the number of condensers in parallel with condenser 5 and thereby increasing the capacity of the rotor circuit causes the instrument to be tuned for a lower frequency and it will therefore immediately rotate into a position to decrease the frequency of the alternator. As soon as the frequency of the alternator has been decreased to this lower value the instrument will resume its vibratory governing function previously described. A frequency or speed scale may be provided opposite a pointer integral with nut 38 moved by the sliding contactor 35 which scale will be calibrated to indicate the frequency or speed corresponding to the various positions of the contactor 35. One or more such variable capacity devices may be located any desirable distances away from the turbine so that the turbine speed may be accurately controlled from one or more distant points such, for example, as the bridge of an electrically propelled ship where the propellers are driven by alternating current motors supplied by the turbo alternator. In some cases where it is desired to control the speed through a very wide range, it may be necessary to also tune the circuit of the auxiliary stator winding. While I have shown a variable capacity for tuning purposes, I do not wish to be limited thereto as it will be evident that the same results could be accomplished by a variable reactance or by a combination of both capacity and reactance.

It has just been explained how a change in the tuning of the secondary circuit causes a change in the position of the rotor. Therefore, with a source of absolutely constant frequency my instrument may be used as a very sensitive instrument for detecting small variations in capacities or reactances. In such an instrument the scale would be calibrated in capacity or reactance units as the case may be.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. An electrical instrument comprising a stator element and a rotor element, a pair of angularly disposed windings on one of said elements inductively related to a winding on said other element, one winding of said pair comprising a primary coil and the other windings of the instrument comprising a tuned secondary system, the tuning frequency of which changes with different positions of the rotor elements.

2. A frequency responsive instrument comprising a primary coil and a secondary system therefor, the latter comprising relatively movable inductively related windings closed through condensers, the magnetic axis of one of said windings being disposed at a fixed angle with respect to the magnetic axis of said primary coil whereby the other winding of said secondary system is caused to take up a position relative to said primary coil dependent upon the frequency of the current in said primary coil.

3. A frequency responsive instrument having a primary exciting coil adapted to be connected to a source of alternating current and a secondary winding system tuned to a frequency corresponding to that of the source, said secondary system comprising a pair of inductively related coils closed through condensers, one of said coils having its magnetic axis fixed at an angle of approximately 90 degrees with respect to the magnetic axis of said primary coil and the other of said coils forming a rotatable inductive coupling between said angularly displaced coils.

4. A frequency responsive instrument comprising a stator element and a rotor element, a pair of angularly disposed windings on one of said elements inductively related to a winding on said other element, one winding of said pair comprising a primary coil and the other windings of the instrument comprising a secondary system tuned to respond to a definite small range of frequency, and manual means for tuning said secondary winding system to cause the said instrument to respond to a predetermined different small range of frequency.

In witness whereof, I have hereunto set my hand this 28th day of April, 1922.

FRANCIS B. VOGDES.